United States Patent

Lee

[11] Patent Number: 5,862,027
[45] Date of Patent: Jan. 19, 1999

[54] CAM GEAR DRIVING APPARATUS OF A VIDEO CASSETTE RECORDER

[75] Inventor: Hyun-Moo Lee, Seoul, Rep. of Korea

[73] Assignee: Daewoo Electronics Co., Ltd., Rep. of Korea

[21] Appl. No.: 845,429

[22] Filed: Apr. 25, 1997

[30] Foreign Application Priority Data

Apr. 25, 1996 [KR] Rep. of Korea ................ 1996 12791

[51] Int. Cl.$^6$ ................................................ G11B 15/18
[52] U.S. Cl. .............................................. 360/137; 360/85
[58] Field of Search ............................ 360/84, 85, 95, 360/96.1, 96.3, 96.4, 137; 242/340, 341, 342, 349, 354

[56] References Cited

U.S. PATENT DOCUMENTS

| 4,527,208 | 7/1985 | Okita et al. | 360/85 |
| 4,922,357 | 5/1990 | Komatsu et al. | 360/96.3 |
| 5,212,820 | 5/1993 | Tanaka | 360/85 |
| 5,315,459 | 5/1994 | Kimura | 360/85 |
| 5,450,258 | 9/1995 | Kwon | 360/85 |
| 5,486,958 | 1/1996 | Choi et al. | 360/85 |
| 5,691,858 | 11/1997 | Lee et al. | 360/85 |

FOREIGN PATENT DOCUMENTS

| 0 331 043 | 9/1989 | European Pat. Off. . | |
| 2-273358 | 11/1990 | Japan | 360/85 |
| 2 268 616 | 1/1994 | United Kingdom . | |

*Primary Examiner*—David L. Ometz
*Attorney, Agent, or Firm*—Cushman Darby & Cushman Intellectual Property Group of Pillsbury Madison & Sutro, LLP

[57] ABSTRACT

A cam gear driving apparatus of a VCR which can drive a cam gear by a relatively lower starting torque and has spur gears used as a driving gear and a cam gear so that it is easy to adjust tolerance. The cam gear driving apparatus has a driving source for generating power, the driving source having a driving shaft which has a plurality of protrusions at a position adjacent to a distal end, a support for supporting the driving section, the driving section being attached at one end thereof to a base and being connected at an other end thereof with a cam gear shaft, the driving shaft of the driving source extending through the support, a driving gear for rotating a cam gear, the driving gear being rotatably supported by a boss mounted in the base, and a power transfer section for transferring power generated by the driving source from the driving source to the driving gear.

6 Claims, 5 Drawing Sheets

CAM GEAR DRIVING APPARATUS OF A VIDEO CASSETTE RECORDER

BACKGROUND OF THE INVENTION

1. Field of the Invention

The present invention relates to an information recording and reproducing apparatus, such as a video cassette recorder (hereinafter referred to as VCR), and more particularly to a cam gear driving apparatus driving a cam gear which operates a pinch roller assembly, a cassette loading mechanism for loading a cassette on a main base, and a tape loading mechanism for bringing a tape into contact with a head drum.

2. Description of the Prior Art

In general, an information recording and reproducing apparatus such as a VCR records video signals and audio signals on a magnetic tape which is driven through a driving system or reproduces video signals and audio signals from the magnetic tape. The VCR is divided into three types; β, VHS, and 8 mm according to the width of the tape on which an information is recorded. The tape is wound on a supply reel and a take-up reel provided within a cassette. When the cassette is inserted into the cassette inserting port and is mound on the VCR deck, a tape loading mechanism positions the tape from the cassette into a driving position.

The tape wound on the supply reel is drawn by a capstan and a pinch roller so as to be wound on the take-up reel. These heads are disposed between the supply reel aid the take-up reel, so that the three heads erase, record, and reproduce signals by making contact with the tape during a driving of the tape.

At this time, since the capstan and the pinch roller carry out the driving of the tape in a correct direction, the capstan an pinch roller have to rotate at a constant velocity; otherwise the heads can not record information onto the tape correctly and can not reproduce information recorded onto the tape, Also, the capstan and the pinch roller sustain a force, for example a tape tension which draws the tape, in order to maintain an equilibrium with the supply reel so that the heads can make stable contact with the tape and thereby prevent damage of the tape.

In general, operations of the cassette loading mechanism, the tape loading mechanism, and the pinch roller assembly, etc. are established by a cam gear. The cam gear has an upper cam and a lower cam respectively formed on an upper surface and a lower surface thereof, in which the upper cam is connected with the pinch roller assembly, the lower cam is connected with a relay plate assembly, and teeth of the cam gear are engaged with a front loading rack. Also, the cam gear has a mode switch operating gear at the upper surface thereof, which operates a mode switch.

FIG. 1 is a plan view of a VCR deck assembly on which is mounted a cam gear driving apparatus 10 according to the conventional art, and FIG. 2 is a perspective view of cam gear driving apparatus 10 according to the conventional art. Referring to FIGS. 1 and 2, a cam gear driving apparatus 10 according to the conventional arm includes a loading motor 40, which is supported by a supporting member 30 attached at a side of a base 20, for generating power, a driving pulley 44 mounted on a rotating shaft 42 of the loading motor 40, a driven pulley 48, which is supported by supporting member 30, for receiving power transferred through a bolt 46 front driving pulley 44, and a worm 50, which is connected at one end thereof to driver pulley 44 and is engaged with a cam gear 60, for rotating cam gear 60.

In cam gear driving apparatus 10 according to the conventional art as constructed above, when loading motor 40 is operated, a driving force is transmitted through driving pulley 44 connected to rotating shaft 42, belt 46, and driven pulley 48 to worm 50. Accordingly, cam gear 60, which is engaged with worm 50, rotates so that the pinch roller assembly, the relay plate assembly, and the front loading rack which are respectively connected to the upper cam, the lower cam, and the teeth of cam gear 60, are operated by cam gear 60.

However, there is a problem in that since cam gear driving apparatus 10 transmits the driving force of loading motor 40 through driving pulley 44, belt 46, and driven pulley 48 to worm 50, a slip may be created between driving pulley 44 and belt 46 or between driven pulley 48 and belt 46, so that a relatively high starting torque is needed to drive cam gear 60.

Also, there are other problems in that a precise finishing of teeth or worm 50 and cam gear 60 is necessary, and it is difficult, to adjust a tolerance in the assembly of worm 50 and cam gear 60.

SUMMARY OF THE INVENTION

The present invention has been made to overcome the above described problem of the prior art. It is an object of the present invention to provide a head drum assembly of a VCR including an annular transformer which is capable of being piled up so that the number of channels of the transformer are adjustable in accordance with the number of heads mounted on a head drum.

To accomplish the above objective of the present invention, there is provided a cam gear driving apparatus of a VCR comprising:

a driving source for generating power, the driving source having a driving shaft which has a plurality of protrusions at a position adjacent to a distal end thereof;

a supporting means for supporting the driving source, the driving source being attached at one end thereof to a base and being connected at an other end thereof with a cam gear shaft. The driving shaft of the driving source extending through the supporting means;

a driving gear for rotating a cam gear, the driving gear being rotatably supported by a boss mounted in the base; and a means for transmitting power generated by the driving source from the driving source to the driving gear.

The power transmitting means includes a guide member mounted on and fixed to the driving shaft of the driving source, a rotating disc connected to the protrusions of the driving shaft in order to move along the driving shaft, an elastic member disposed between the guide member and the rotating disc, wherein the driving shaft extends through the elastic member, a first friction member attached to a bottom surface of the rotating disc, and a second friction member attached to an upper surface of the driving gear and being in contact with the first friction member.

The elastic member is a spring which forces the rotating disc downward so that the first friction member attached to the bottom surface of the rotating always is in contact with the second friction member attached to the upper surface of the driving gear.

The rotating disc has an angular projection which is formed on an upper surface of the rotating shaft and defines a space for receiving one end of the elastic member, and also has a thruhole perforated at a center thereof and a plurality of slots formed thereon in order to engage with the plurality of protrusions of the driving shaft.

The driving gear has a groove which is formed on an upper surface thereof and which receives the rotating disc, the first friction member, and the second friction member, a diameter of the groove being larger than that of the rotating disc.

The driving gear and the cam gear both are spur gears.

The boss, which is mounted on and fixed to the base and supports the driving gear, is a hollow shaft and the distal end of the driving shaft extends into a thruhole of the boss.

As described above, in the cam gear driving apparatus according to an embodiment of the present invention, since the transferring means directly transmits the rotating force of the driving source to the driving gear by using the friction force of the first friction member and the second friction member, there are advantages that the driving source can drive the driving gear by a relatively lower starting torque and a spur gear can be used as a cam gear so that it is easy to adjust a tolerance.

BRIEF DESCRIPTION OF THE DRAWINGS

The above object and other advantages of the present invention will become more apparent by describing in detail the preferred embodiment thereof with reference to the attached drawings, in which.

DESCRIPTION OF THE PREFERRED EMBODIMENT

Hereinafter, a preferred embodiment of the present invention will be described in detail with reference to the accompanying drawings.

Figure 1:
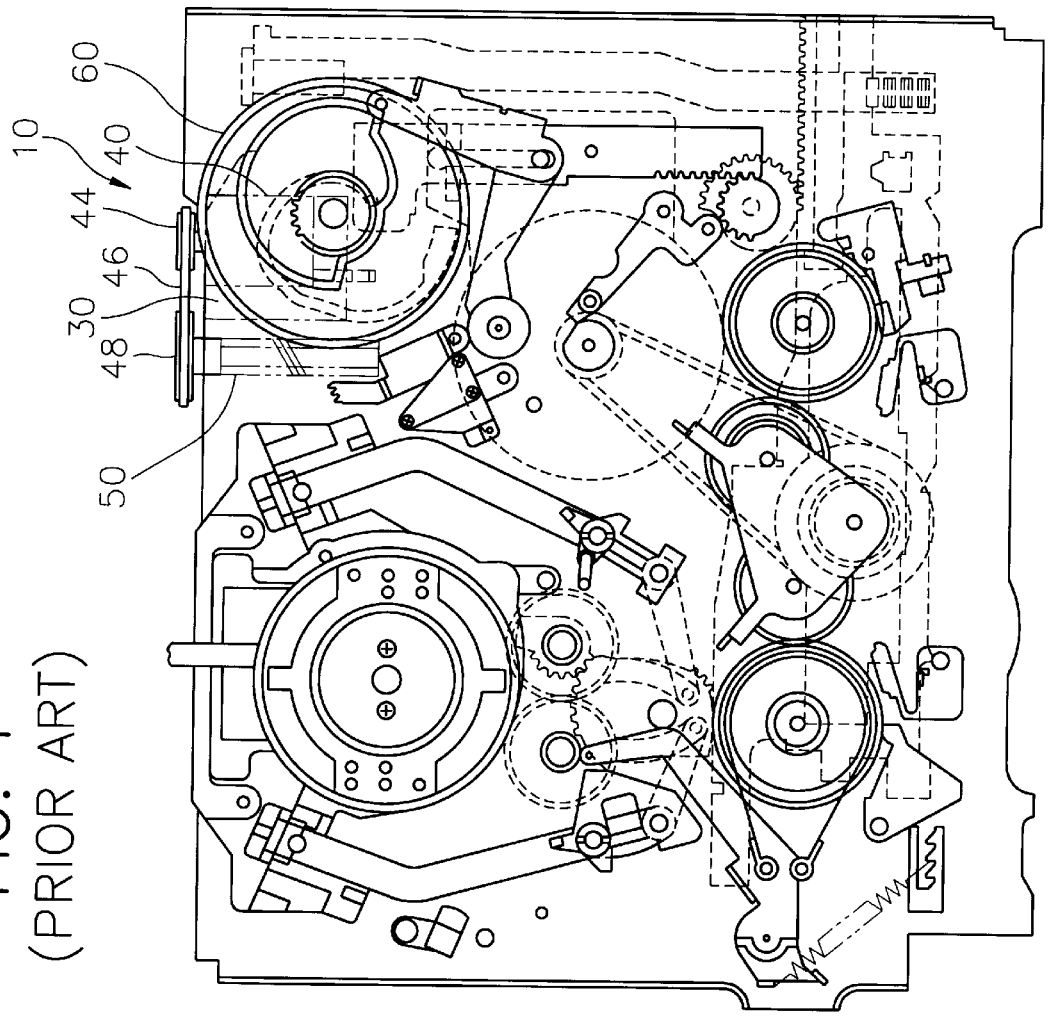
FIG. 1 is a plan view of a VCR deck assembly on which is mounted a cam gear driving apparatus according to the conventional art.
Figure 2:
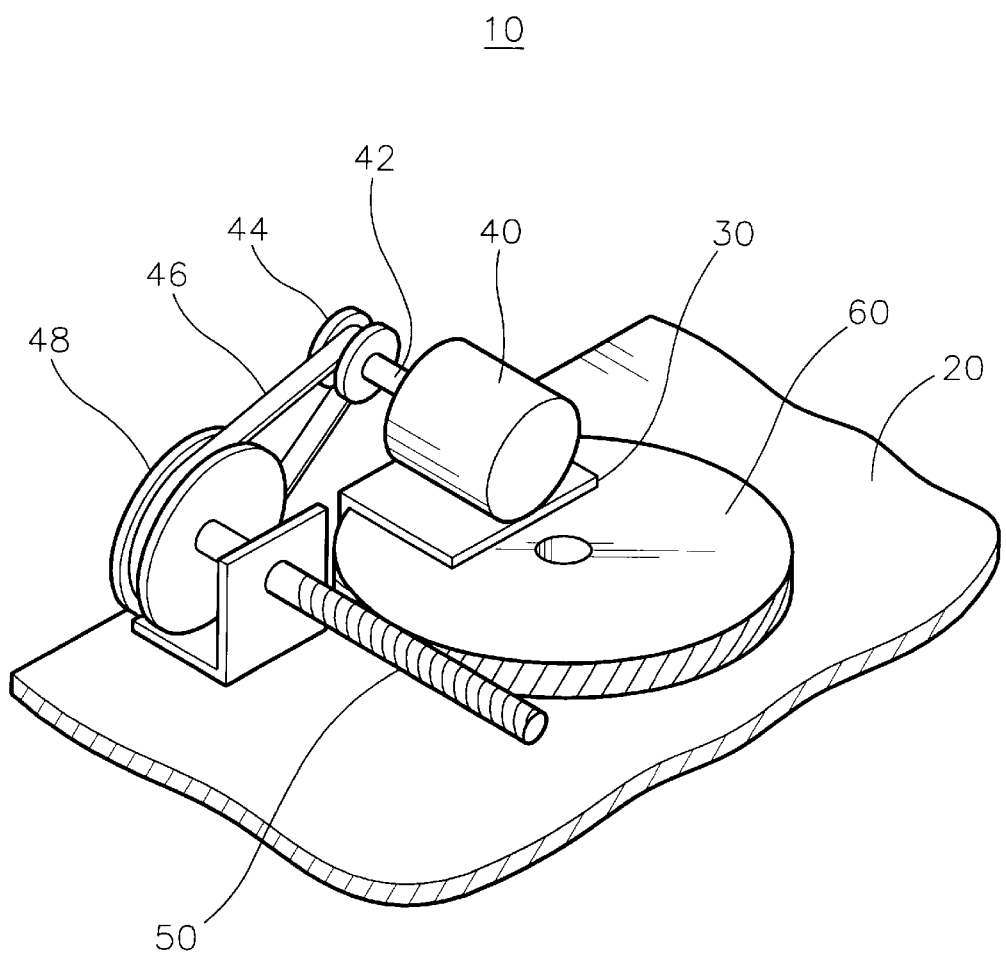
FIG. 2 is a perspective view of the cam gear driving apparatus according to the convention art.
Figure 3:
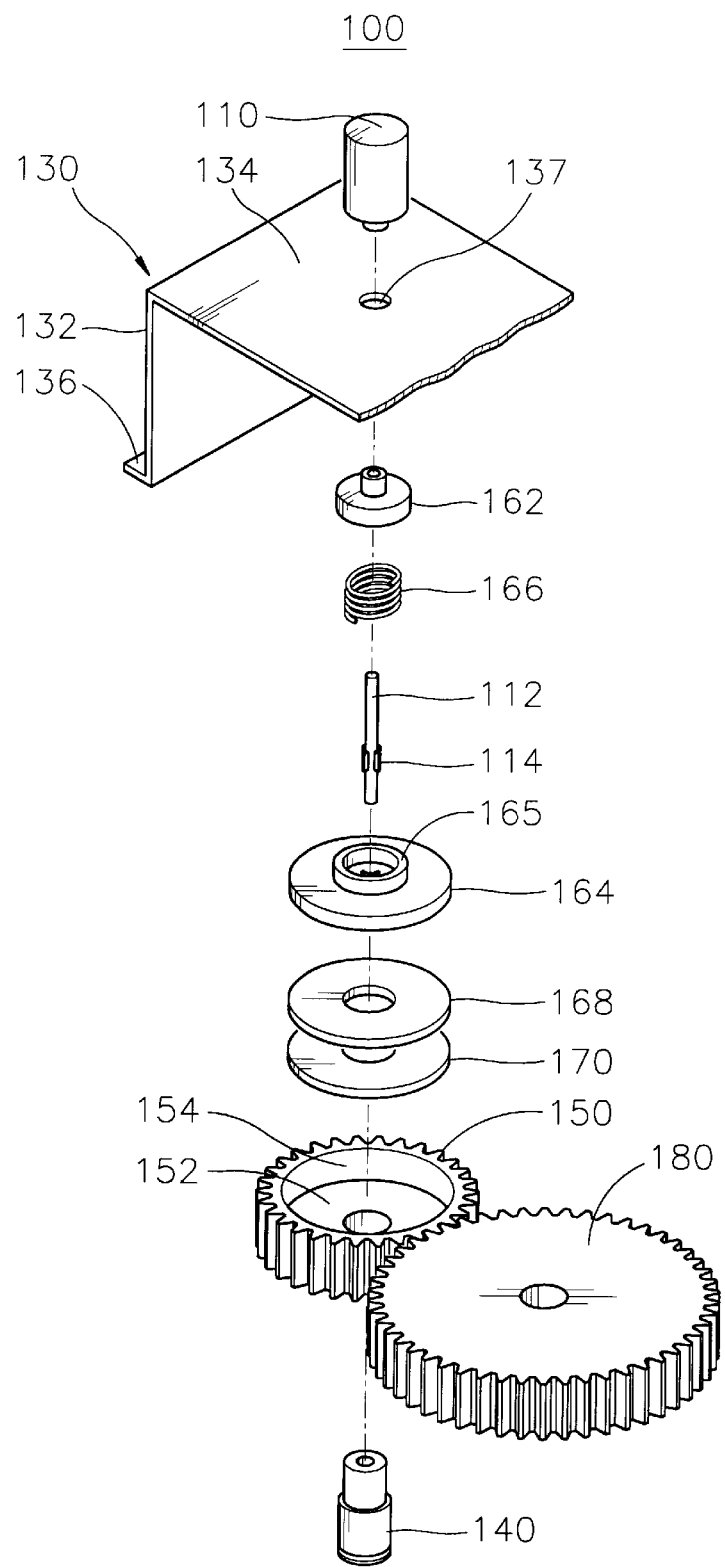
FIG. 3 is an exploded perspective view of a cam gear driving apparatus of a VCR according to an embodiment of the present invention.
Figure 4:
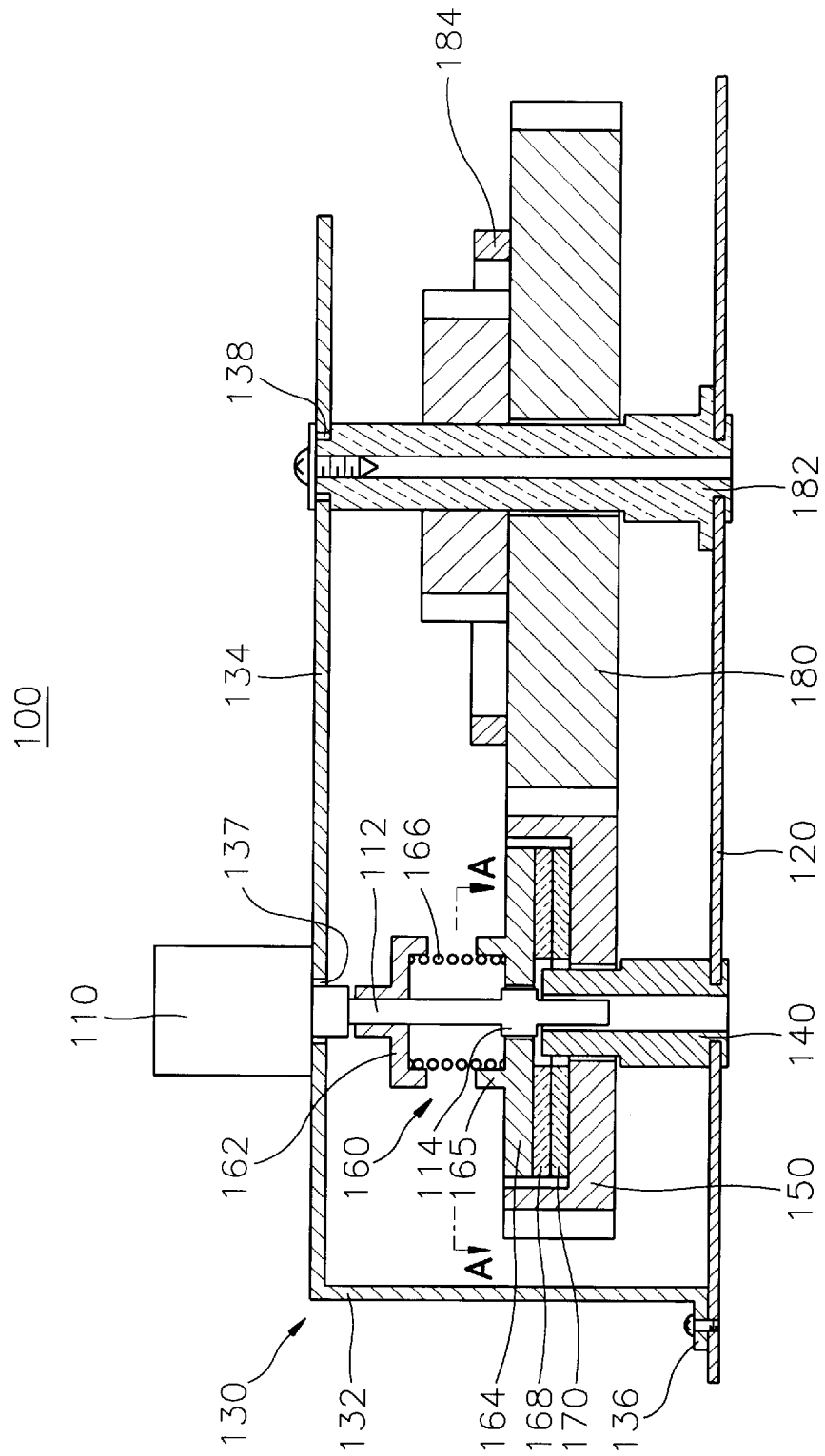
FIG. 4 is a longitude-section view of the cam gear driving apparatus of the VCR according to the embodiment of the present invention in FIG. 3.

FIG. 3 is an exploded perspective view of a cam gear driving apparatus 100 of a VCR according to an embodiment of the present invention, and FIG. 4 is a longitude-sectional view of cam gear driving apparatus 100 of the VCR according to the embodiment of the present invention in FIG. 3.

Referring to FIGS. 3 and 4, cam gear driving apparatus 100 or a VCR according to the embodiment of the present invention comprises a driving source 110 for generating power, which includes a driving shaft 112 having a plurality of protrusions 114 at a position adjacent to a distal end thereof, a supporting member 130 for supporting driving source 110 which is attached at one end thereof to a disc 120 and is connected at an other end thereof with a cam gear shaft 182, whose driving shaft 112 extends through supporting member 130, a driving gear 150, which is rotatably supported by a boss 140 mounted in base 120, for rotating a cam gear 180, and a power transmitting mechanism for transmitting power generated by driving source 110 from driving source 110 to driving gear 150.

An electric motor generally is used as driving source 110, and is disposed on supporting member 130 so that driving shaft 112 extends through supporting member 130. Driving shaft 112 of driving source 110 has at least two protrusions 114 at a position adjacent to the distal end thereof.

Supporting member 130 includes a side wall portion 132, a roof portion 134, and a bottom wall portion 136 extending from a lower end of side wall portion 132 in an opposite direction to that in which roof portion 134 extends. Two holes 137 and 138 are formed in roof portion 134 and spaced apart from each other at a predetermined distance on the same axis. Driving source 110 is disposed at thruhole 137 adjacent to side wall portion 132, and driving shaft 112 thereof extends through thruhole 137. Also an upper end portion of cam gear shaft 182 is inserted into thruhole 138 adjacent to an outer edge of roof portion 134 and fixed to cam gear shaft 182 by a screw. On the other hand, a plurality of thruholes are perforated in bottom wall portion 136 and secured against base 120 by screws.

Boss 140 is a hollow shaft and has a step portion formed at an intermediate portion of an outer surface thereof. Boss 140 is inserted into a thruhole of base 120 and fixed to base 120 in an outsert-molding manner, and has a central axis which is identical with an axis of driving shaft 112 of driving source 110.

Diving gear 150 includes a circular bottom portion 152 and an annular wall portion 154 extending upwardly from an edge of bottom portion 152. Bottom portion 152 and wall portion 154 define a space for receiving a rotating disc 164, a first friction member 168, and a second friction member 170, which are described hereinafter. Bottom portion 152 has a thruhole at a center thereof and teeth at a peripheral of wall portion 154. Driving gear 150 is inserted into and rotatably disposed on boss 140 so as to transmit the driving force from power transmitting apparatus 160 to cam gear 180.

Power transmitting apparatus 160 includes a guide member 162 mounted on and fixed to driving shaft 112 of driving source 110, rotating disc 164 connected to protrusions of driving shaft 112 in order to move along driving shaft 112, an elastic member 166 disposed between guide member 102 and rotating disc 164, wherein driving shaft 112 extends through elastic member 166, a first friction member 168 attached to a bottom surface of rotating disc 164, and a second friction member 170 attached to an upper surface of driving gear 150 and being in contact with first friction member 168.

Guide member 162 includes a cylindrical body, a bottom portion extending radially outward from a lower end of the body, and a wall portion extending downward from an edge of the bottom portion. Guide member 162 is mounted on and secured to driving shaft 112. A space defined by the bottom portion and the wall portion receives one end of elastic member 166, for example a spring, thereby guide member 162 can supporting elastic member 166.

Figure 5:
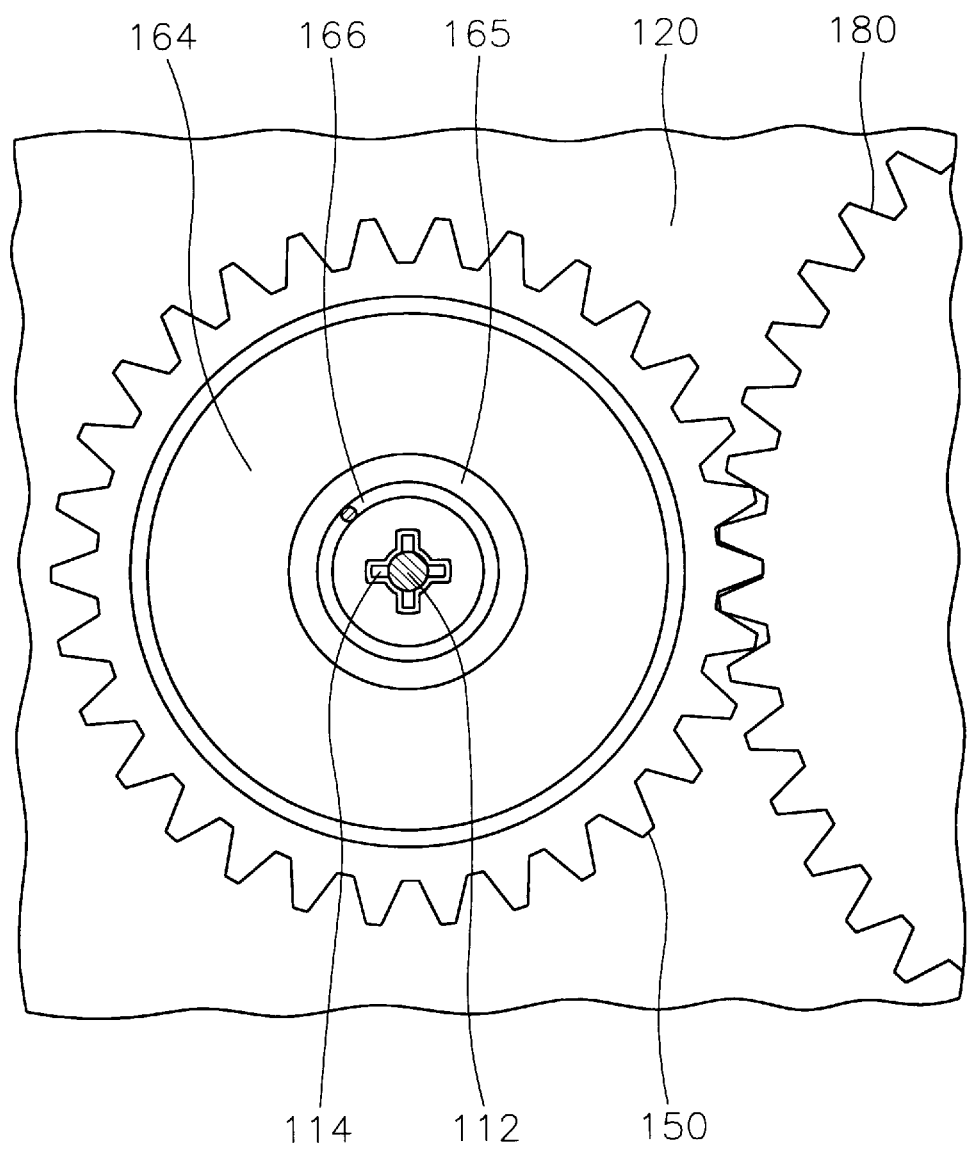
FIG. 5 is a sectional view of the cam gear driving apparatus taken along line A—A in FIG. 4, showing the connection of a driving shaft and a rotating disc.

Referring FIGS. 4 and 5, rotating disc 164 has an annular projection 165 formed on an upper surface thereof. Another end of elastic member 166 is received in a space defined by annular projection 165. Rotating disc 164 has a thruhole at a center thereof and a plurality of slots formed radially outward from the thruhole. Accordingly, when rotating disc 164 is mounted on driving shaft 112, the plurality of slots are engaged with the plurality of protrusions 114 of driving shaft 112.

First friction member 168 and second friction member 170 generally are formed of asbestos. First friction member 168 is attached by an adhesive to a lower surface of rotating disc 164, and second friction member 170 is attached by an adhesive to an upper surface of bottom portion 152 of driving gear 150.

Elastic member 166, disposed in a compressed state between guide member 162 and rotating disc 164, is received in guide member 162 at one end thereof, and is supported by the surface of rotating disc 164 at the other end thereof. In this state, elastic member 166 always forces rotating disc 164 downward. Therefore, first friction member 168 attached to the lower surface of rotating disc 164 makes contact with second friction member 170 attached to the upper surface of bottom portion 152 of driving gear 150.

Hereinafter, the operation of each of the elements of cam gear driving apparatus 10 of the VCR according to the embodiment of the present invention will be described.

In cam gear driving apparatus 10 according to the embodiment of the present invention when electricity is supplied to driving source 110, driving shaft 112 of driving source 110 is rotated and rotates rotating disc 164. At this time, elastic member 106 disposed between guide member 162 and rotating disc 164 rotates with driving shaft 112 of driving source 110 while forcing rotating disc 164 downward. Therefore, since first friction member 168 attached to the lower surface of rotating disc 164 is brought into tight contact with second friction member 170 attached to the upper surface of bottom portion 152 of driving gear 150 by the elastic force of elastic member 166, the driving force of driving shaft 112 is transmitted to driving gear 150 to rotate driving gear 150, and thereby rotating cam gear 180.

When cam gear 180 rotates to a predetermined angle, a pinch roller assembly and a relay plate assembly are operated by cams 184 respectively formed on an upper surface and a lower surface of cam gear 150. At the same time, a mode switch, which is engaged with a mode switch operating gear formed on the upper surface of cam gear 180, cuts off electricity supplied to driving source 110 go that driving source 110 stops operating.

On the other hand, when the pinch roller assembly, the relay plate assembly, and a fronting load rack operated by cam gear 180 malfunction or error during operation so that overload is sent to cam gear 180, a slip is created between first friction member 168 and second friction member 170 so as to prevent the breaking of driving source 110.

As described above, in the cam gear driving apparatus according to an embodiment of the present invention, since the transferring means directly transmits the rotating force of the driving source to the driving gear by using the friction force of the first friction member and the second friction member, there are advantages that the driving source can drive the driving gear by a relatively lower starting torque and a spur gear can be used as a cam gear so that it is easy to adjust tolerance.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A cam gear driving apparatus of a video cassette recorder comprising:

a driving source for generating power, said driving source having a driving shaft which has a plurality of protrusions at a position adjacent to a distal end thereof;

a supporting means for supporting said driving source, said support means being attached at one end thereof to a base and being connected at an other end thereof with a cam gear shaft of a cam gear, said driving shaft of said driving source extending through said supporting means;

a driving gear for rotating said cam gear, said driving gear being rotatably supported by a boss mounted in said base; and a means for transmitting power generated by said driving source from said driving source to said driving gear, said power transmitting means includes a guide member mounted on and fixed to said driving shaft of said driving source, a rotating disc connected to said protrusions of said driving shaft in order to move along said driving shaft, an elastic member disposed between said guide member and said rotating disc, wherein said driving shaft extends through said elastic member, a first friction member attached to a bottom surface of said rotating disc, and a second friction member attached to an upper surface of said driving gear and being in contact with said first friction member.

2. A cam gear driving apparatus of a video cassette recorder as claimed in claim 1, wherein said elastic member is a spring which forces said rotating disc downward so that said first friction member attached to the bottom surface of said rotating disc always is in contact with said second friction member attached to the upper surface of said driving gear.

3. A cam gear driving apparatus of a video cassette recorder as claimed in claim 2, wherein said rotating disc has an annular projection which is formed on an upper surface of said rotating disc and defines a space for receiving one end of said spring, and also has a thruhole perforated at a center thereof and a plurality of slots formed thereon in order to engage with the plurality of protrusions of said driving shaft.

4. A cam gear driving apparatus of a video cassette recorder as claimed in claim 1, wherein said driving gear has a groove which is formed on the upper surface thereof and which receives said rotating disc, said first friction member, and said second friction member, a diameter of the groove being larger than that of said rotating disc.

5. A cam gear driving apparatus of a video cassette recorder as claimed in claim 4, wherein said driving gear and said cam gear both are spur gears.

6. A cam gear driving apparatus of a video cassette recorder as claimed in claim 1, wherein said boss, which is mounted on and fixed to said base and supports said driving gear, is a hollow shaft and the distal end of said driving shaft extends into a thruhole of said boss.

* * * * *